United States Patent
Malsam

(10) Patent No.: US 6,726,132 B2
(45) Date of Patent: *Apr. 27, 2004

(54) CORNER IRRIGATION SYSTEM INCLUDING AN ULTRA WIDE BAND (UWB) GUIDANCE SYSTEM

(75) Inventor: Craig S. Malsam, Omaha, NE (US)

(73) Assignee: Valmont Industries, Inc., Valley, NE (US)

( * ) Notice: Subject to any disclaimer, the term of this patent is extended or adjusted under 35 U.S.C. 154(b) by 70 days.

This patent is subject to a terminal disclaimer.

(21) Appl. No.: 09/877,431

(22) Filed: Jun. 8, 2001

(65) Prior Publication Data

US 2002/0185556 A1 Dec. 12, 2002

(51) Int. Cl.$^7$ .............................. B05B 3/00; B05B 3/18; A01G 27/00; H04Q 7/00; H04Q 9/00
(52) U.S. Cl. .................. 239/729; 239/728; 239/731; 239/69; 318/16
(58) Field of Search .................. 239/69, 728, 729, 239/731; 318/16

(56) References Cited

U.S. PATENT DOCUMENTS

| | | | | |
|---|---|---|---|---|
| 3,797,517 A | * | 3/1974 | Kircher et al. ............... | 239/738 |
| 3,902,668 A | * | 9/1975 | Daugherty et al. .......... | 239/729 |
| 4,340,183 A | * | 7/1982 | Kegel et al. ................. | 239/729 |
| 4,508,269 A | * | 4/1985 | Davis et al. ................. | 239/729 |
| 4,569,481 A | * | 2/1986 | Davis et al. ................. | 239/729 |
| 4,674,681 A | * | 6/1987 | Meis et al. .................... | 239/1 |
| 6,036,122 A | * | 3/2000 | Gerdes et al. ............... | 239/729 |
| 6,045,066 A | * | 4/2000 | Gerdes et al. ............... | 239/729 |
| 6,054,950 A | * | 4/2000 | Fontana ....................... | 342/463 |
| 6,085,999 A | * | 7/2000 | Gerdes et al. ............... | 239/729 |
| 6,095,439 A | * | 8/2000 | Segal et al. .................. | 239/729 |
| 6,111,536 A | * | 8/2000 | Richards et al. ............. | 342/125 |
| 6,290,151 B1 | * | 9/2001 | Barker et al. ................ | 239/729 |
| 6,295,019 B1 | * | 9/2001 | Richards et al. ............. | 342/125 |
| 6,469,628 B1 | | 10/2002 | Richards et al. | |

* cited by examiner

Primary Examiner—Michael Mar
Assistant Examiner—Darren Gorman
(74) Attorney, Agent, or Firm—Thomte, Mazour & Niebergall; Dennis L. Thomte

(57) ABSTRACT

A self-propelled irrigation machine including an elongated main boom pivoted at one end to a center pivot and supported on a plurality of self-propelled, non-steerable drive units. An extension boom is pivotally secured to the other end of the main boom for irrigating corner areas of the field. A steerable drive tower supports the extension boom and includes a pair of steerable drive wheels. The guidance and control for the extension boom includes a UWB receiver and a computer positioned on the steerable drive tower for receiving and processing UWB information as to the location of the steerable drive tower and for determining the optimal steer angle for the steerable drive wheels relative to the movement of the main boom. At least one UWB transmitters are located within receiving range of the UWB receiver. Signals transmitted by the UWB transmitters are received by the UWB receiver on the steerable drive unit and are used to determine current location and optimal steer angles relative to the main boom.

3 Claims, 1 Drawing Sheet

CORNER IRRIGATION SYSTEM INCLUDING AN ULTRA WIDE BAND (UWB) GUIDANCE SYSTEM

BACKGROUND OF THE INVENTION

1. Field of the Invention

This invention relates to a center pivot irrigation system having the ability to irrigate the corners of the field being irrigated. More particularly, this invention relates to an improved means for guiding the movement of the corner span with respect to the center pivot portion of the system which includes an ultra wide band (UWB) guidance system.

2. Description of the Related Art

Conventional center pivot irrigation systems comprise an elongated main boom pivotally connected at its inner end to a center pivot structure and extending outwardly therefrom. The main boom of the conventional center pivot irrigation system is comprised of a plurality of pipes connected together in an end-to-end fashion which are supported upon a plurality of drive towers. In most conventional center pivot irrigation systems, the outermost drive tower is the master tower with the other drive towers being selectively driven in response to angular displacement of the boom section adjacent thereto.

In the early 1970s, corner systems for center pivot irrigation systems were developed to enable the corners of a square field to be irrigated. See, for example, U.S. Pat. Nos. 3,797,517 and 3,902,668.

Although the prior art systems do perform generally satisfactorily to drive and steer the extension booms, it is believed that the instant invention, utilizing an ultra wide band (UWB) guidance system, is more reliable and is more accurate than the prior art systems.

SUMMARY OF THE INVENTION

A self-propelled irrigation system is disclosed which includes an elongated main boom pivoted at one end to a center pivot apparatus which is supported on a plurality of self-propelled, non-steerable drive towers, with an extension boom (corner span) pivotally secured to the other end of the main boom for irrigating corner areas of the field. A steerable drive tower supports the extension boom and includes a pair of steerable wheels. A steering means is provided for steering the steerable drive wheels for guiding the steerable drive tower along a preselected path, thereby causing the pivotal extension of the extension boom into the corner areas of the field as the main boom approaches the same and pivotal retraction of the extension boom out of the corner areas of the field as the main boom departs the same. A control means is provided for controlling the steering of the drive wheels of the steerable drive tower. The control means includes an ultra wide band (UWB) receiver and a computer means for receiving and processing UWB information as to the location of the steerable drive tower and for determining the optimal steer angle for the steerable drive wheels relative to the movement of the main boom for positioning the steerable drive wheels in the optimal steer angle. The UWB receiver and computer are positioned on the steerable drive tower. One or more UWB transmitters are located within receiving range of the UWB receiver. Signals transmitted by the UWB transmitters are received by the UWB receiver on the steerable drive tower and are used to determine current position and optimal steer angle relative to the main boom.

Therefore, it is a principal object of the invention to provide a corner irrigation system including an UWB guidance system.

A further object of the invention is to provide a corner irrigation system including an UWB receiver means and a computer means for receiving and processing UWB information as to the location of the main boom and for determining the optimum steer angle for the steerable drive wheels of the extension boom for the current position of the main boom and for positioning the steerable drive wheels in the optimal steer angle.

A further object of the invention is to provide a system of the type described which utilizes an UWB guidance means to accurately position the extension boom with respect to the main boom.

These and other objects will be apparent to those skilled in the art.

DESCRIPTION OF THE PREFERRED EMBODIMENT

Figure 1:
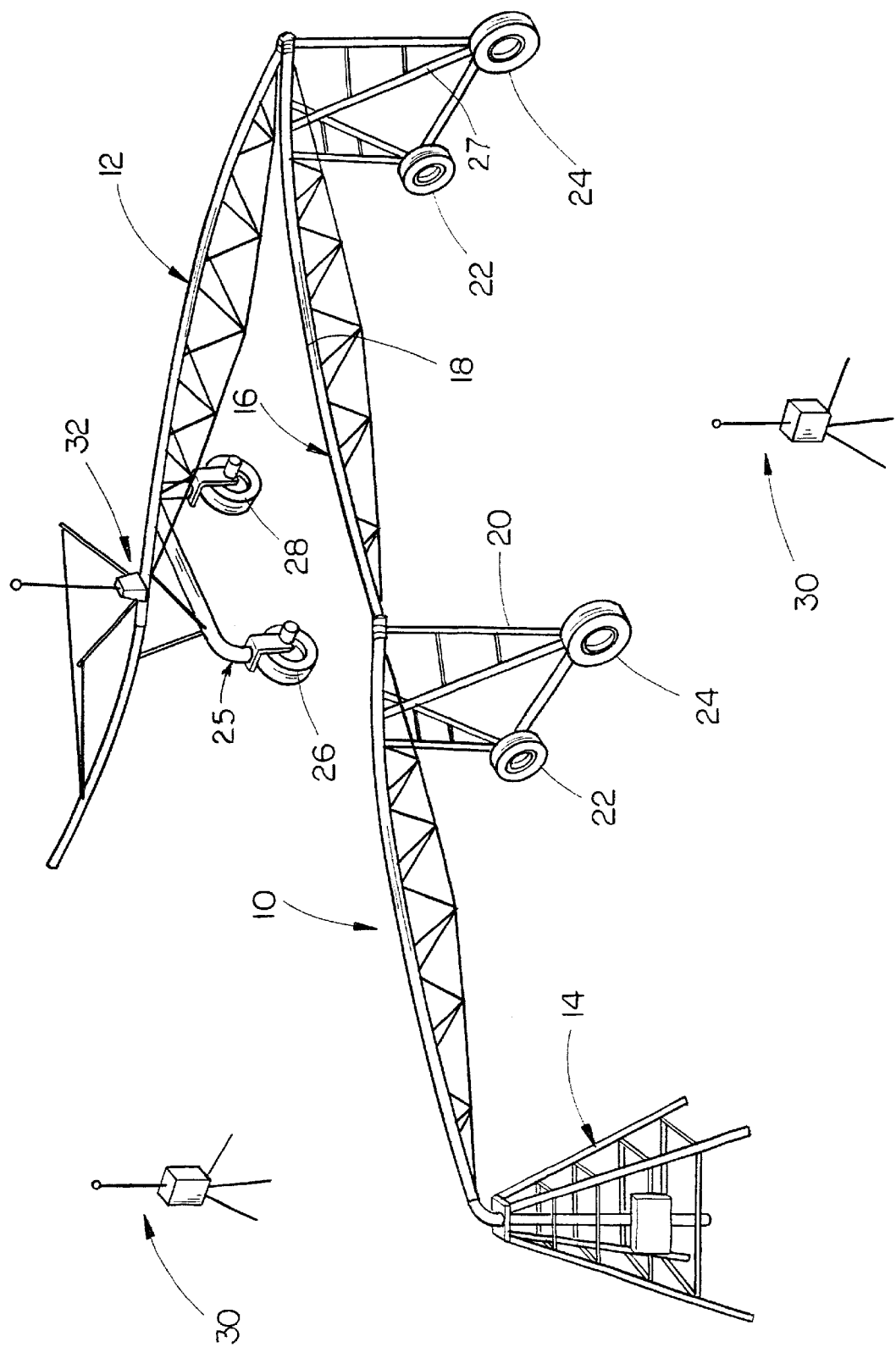
FIG. 1 is a perspective view of a conventional corner irrigation system including an UWB guidance system.

In FIG. 1, the numeral 10 refers to a mechanized irrigation system which, in this case, is a center pivot system having a corner irrigation system or corner span 12 at the outer end thereof. System 10 includes a stationary pivot 14 about which the system pivots in the field to irrigate the field. System 10 includes a main boom generally indicated at 16 including a water line 18 which extends outwardly from the pivot 14 and which is supported upon a plurality of non-steerable drive towers 20 which each include drive wheels 22 and 24. Although only two drive towers 20 are illustrated in FIG. 1, the main boom 16 could utilize any number of drive towers.

Corner irrigation system or corner span 12 is pivotally connected at its inner end to the last regular drive unit (LRDU) 27 and which is supported upon a steerable drive tower or unit (SDU) 25 having a pair of steerable drive wheels 26 and 28 which are mechanically steered by an electric motor in conventional fashion except for the control or guidance means therefore. Normally, the current method for controlling the extension and retraction of the corner span 12 relies on sensing the electric field generated by a cable buried along the desired path of the SDU 25, on a corner arm equipped center pivot irrigation system such as disclosed in U.S. Pat. No. 3,902,668. With this approach, an oscillator at the pivot 12 is used to generate a low frequency signal in a buried cable with an antenna and signal processing electronics being mounted on the SDU to detect the electric field radiated from the buried cable and determine the appropriate steer angle of the SDU wheels 26 and 28 which keep the SDU 25 over the top of the buried cable. Cable and installation expenses, as well as servicing cable breaks, are disadvantages of this method. It is to this conventional corner arm equipped center pivot irrigation system that the UWB guidance system of this invention is utilized.

The guidance system of this invention includes a control means for steering the drive wheels 26 and 28 of the SDU 25. The control means includes a UWB receiver means and a computer 32 for receiving and processing UWB information as the location of the steerable drive tower and for determining the optimal steer angle for the steerable drive wheels 26 and 28 relative to the movement of the main boom 16. The UWB receiver means and computer means 32 are located on or closely adjacent the SDU 25. One or more UWB transmitters 30 are located within receiving range of the UWB receiver 32. Radio signals transmitted by the UWB transmitters 30 are received by the UWB receiver 32 on the steerable drive unit 25 and are used to determine current position and optimal steer angle relative to the main boom. Once the computer has determined the optimal steer angle of the drive wheels 26 and 28 relative to the main boom, the control means causes the drive wheels 26 and 28 to be moved to that optimal steer angle so that the corner span 12 will follow its desired path relative to the main boom.

Thus it can be seen that a novel UWB guidance system has been provided for guiding the movement of a corner span with respect to the main boom of the irrigation system.

It can therefore be seen that the invention accomplishes at least all of its stated objectives.

I claim:

1. A self-propelled irrigation machine having an elongated main boom pivoted at one end to a center pivot apparatus and mounted on a plurality of self-propelled, non-steerable drive towers, an extension boom pivotally secured to the other end of the main boom for irrigating corner areas of the field, a steerable drive tower supporting said extension boom including a pair of steerable drive wheels and steering means for steering said steerable drive wheels for guiding said steerable drive tower along a preselected path thereby causing the pivotal extension of said extension boom into the corner areas of the field as said main boom approaches the same and pivotal retraction of said extension boom out of the corner areas of the field as said main boom departs the same, the improvement comprising:

control means for controlling the operation of said means for steering said steerable drive wheels;

said control means including at least one UWB transmitter which transmits UWB radio signals towards said steerable drive tower;

said control means also including a UWB receiver and a computer means for receiving and processing UWB information from said UWB transmitter as to the location of said steerable drive tower and for determining the optimal steer angle of said steerable drive wheels relative to the movement of said main boom and for causing the steering means to position said steerable drive wheels in the optimal steer angle.

2. The self-propelled irrigation system of claim 1 wherein at least two UWB transmitters are provided which transmit UWB radio signals to said UWB receiver.

3. The self-propelled irrigation system of claim 1 wherein said UWB receiver is located on said steerable drive tower.

\* \* \* \* \*